(12) United States Patent
Campbell

(10) Patent No.: US 11,592,353 B2
(45) Date of Patent: Feb. 28, 2023

(54) METHOD OF INSPECTING AND MONITORING A FIBER TERMINATION

(71) Applicant: Richard V. Campbell, Havana, FL (US)

(72) Inventor: Richard V. Campbell, Havana, FL (US)

(*) Notice: Subject to any disclaimer, the term of this patent is extended or adjusted under 35 U.S.C. 154(b) by 321 days.

(21) Appl. No.: 16/747,580

(22) Filed: Jan. 21, 2020

(65) Prior Publication Data

US 2021/0033487 A1 Feb. 4, 2021

Related U.S. Application Data

(60) Provisional application No. 62/881,213, filed on Jul. 31, 2019.

(51) Int. Cl.
*G01M 5/00* (2006.01)
*B29C 65/00* (2006.01)
*F16G 11/04* (2006.01)
*B29L 31/00* (2006.01)

(52) U.S. Cl.
CPC .......... *G01M 5/0025* (2013.01); *B29C 66/69* (2013.01); *F16G 11/042* (2013.01); *B29L 2031/707* (2013.01)

(58) Field of Classification Search
CPC ............ G01M 5/0025; G01M 5/0058; G01M 5/0091; G01M 5/0033; B29C 66/69; F16G 11/042; F16G 11/025; B29L 2031/707; G01B 7/16; G01B 11/16
See application file for complete search history.

(56) References Cited

U.S. PATENT DOCUMENTS

| | | | |
|---|---|---|---|
| 2006/0285813 A1* | 12/2006 | Ferguson | G01D 11/245 374/E15.001 |
| 2015/0300452 A1* | 10/2015 | Campbell | F16G 11/025 403/275 |
| 2015/0300542 A1* | 10/2015 | Graham | F16L 19/0206 285/393 |
| 2018/0245666 A1* | 8/2018 | Campbell | D07B 5/00 |
| 2019/0178734 A1* | 6/2019 | Campbell | G01C 21/16 |

* cited by examiner

Primary Examiner — Raul J Rios Russo
Assistant Examiner — Carl F. R. Tchatchouang
(74) Attorney, Agent, or Firm — J. Wiley Horton

(57) ABSTRACT

A system for monitoring the performance of a multi-stranded tensile member where a portion of the strands are concealed within a termination. The invention provides a monitoring system that allows the user to determine when one or more of the strands has degraded to a point of concern. In some embodiments the monitoring system depends on visual inspection and in other embodiments the monitoring system is automated.

13 Claims, 21 Drawing Sheets

METHOD OF INSPECTING AND MONITORING A FIBER TERMINATION

CROSS-REFERENCES TO RELATED APPLICATIONS

This non-provisional patent claims the benefit, pursuant to 37 C.F.R. section 1.53(c), of an earlier-filed provisional patent application assigned Ser. No. 62/881,213. The provisional application listed the same inventor.

STATEMENT REGARDING FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of tensile strength members. More specifically, the invention comprises a termination for a multi-stranded synthetic cable that incorporates inspection and monitoring features.

2. Description of the Related Art

A significant application for the present invention is the field of multi-stranded synthetic tensile strength members. Tensile strength members must generally be connected to other components in order to be useful. A flexible cable provides a good example. The cable must generally include some type of end-fitting so that it can be transmit a load. For example, a cable used in a hoist generally includes a lifting hook on its free end. This lifting hook may be rigged to a load. The assembly of an end-fitting and the portion of the cable to which it is attached is generally called a "termination."

The prior art approaches to adding a termination are explained in detail in commonly-owned U.S. Pat. Nos. 7,237,336; 8,048,357; 8,236,219 and 8,371,015. These prior patents are hereby incorporated by reference. The prior art approaches are also explained in detail in commonly-owned U.S. patent application Ser. Nos. 13/678,664 and 15/710,692. These published pending applications are also hereby incorporated by reference.

The present invention is particularly applicable to cables incorporating advanced high-strength synthetic filaments (also known as "fibers"). Many different materials are used for these filaments. These include DYNEEMA (ultra-high-molecular-weight polyethylene), SPECTRA (ultra-high-molecular-weight polyethylene), TECHNORA (aramid), TWARON (p-phenylene terephthalamide), KEVLAR (para-aramid synthetic fiber), VECTRAN (a fiber spun from liquid-crystal polymer), PBO (poly(p-phenylene-2,6-benzobisoxazole)), carbon fiber, and glass fiber (among many others). In general the individual filaments have a thickness that is less than that of human hair. The filaments are very strong in tension, but they are not very rigid. They also tend to have low surface friction. These facts make such synthetic filaments difficult to handle during the process of adding a termination and difficult to organize. The present invention is particularly applicable to terminations made of such high-strength filaments, for reasons which will be explained in the descriptive text to follow.

Those skilled in the art will know that cables made from synthetic filaments have a wide variety of constructions. Most such cables have a twisted, woven, or braided construction in which multiple strands are joined together. The strands are generally assembled into a whole as: (1) an entirely parallel construction enclosed in a jacket made of different material, (2) a helical "twist" construction, or (3) a more complex construction of multiple helices, multiple braids, or some combination of helices and braids.

Throughout this disclosure cables will be used as an example of a tensile strength member. However the invention should not be viewed as being limited to cables. The term "tensile strength member" or "tensile member" encompasses cables and sub-components of cables such as strands. The reader is referred to commonly-owned U.S. Pat. No. 8,371,015 for more detailed descriptions regarding the application of an attachment to a sub-component of a larger cable. The reader is also referred to commonly-owned U.S. Pat. Nos. 8,371,015 and 9,835,228 regarding methods for terminating a multi-stranded cable and commonly-owned U.S. patent application Ser. Nos. 14/693,811 and 15/831,755 for the same. The invention also encompasses non-cable structures intended to carry loads in tension.

The reader should be aware that many terms are used inconsistently in the field of tensile strength members. As an example, the term "cable" is often used to refer to a flexible tensile strength member made of a helical winding of smaller components. The term "rope" is often used to refer to a tensile strength member having a braided or woven construction (rather than a helical construction). A common example of this inconsistency in terminology is "wire rope." Wire rope is made of a helical winding of steel wires. One might expect this configuration to be called a "cable"—and sometimes it is referred to that way—but more often it is just called "wire rope."

Likewise, the term "anchor" should be viewed broadly to encompass virtually anything that can be attached to a rope or cable. A single anchor may be attached to the entire cable. In other cases an anchor may be attached to each strand (or other subgroup) of a cable so that a single end of a cable has multiple anchors. These multiple anchors are then typically gathered together by one or more additional components. In this disclosure such a gathering component is called a "collector." An anchor ordinarily includes some feature or features facilitating attachment—such as a hook or a threaded shaft. These features are conventional and have not been illustrated in detail in many of the disclosed embodiments.

An anchor is most commonly attached to a strand by potting. The anchor includes an internal cavity configured to receive a length of splayed filaments—usually a length from the end of a strand. Liquid potting compound is introduced into the splayed filaments within the cavity via a wide variety of methods. These include: (1) "painting" or otherwise wetting the filaments with potting compound and then sliding the anchor into position over the painted filaments, (2) positioning the splayed filaments in the cavity and then pouring in potting compound, (3) pre-wetting the filaments in a separate mold designed to wet the filaments, and (4) injecting pressurized potting compound into the cavity. However the potting compound is introduced, the splayed filaments remain within the cavity while the potting compound hardens. Once it has hardened the result is a mechanical interlock between the filament-reinforced "plug" of solid material and the cavity. Tension applied to the strand will be transferred to the anchor via the mechanical interference. The load from all the anchors on all the strands is typically passed through a collector to some external component.

The reader should bear in mind, however that an anchor can be attached to a strand using methods other than potting. One additional example is the use of a "spike-and-cone" mechanical interlock between a strand and an anchor. This invention is not limited to potting or any other approach.

Cables made of synthetic filaments offer higher performance than steel cables. As an example, the strength-to-weight ratio for a synthetic cable is considerably higher that a steel cable. However, the lack of meaningful inspection and retirement criteria is an impediment to the adoption of synthetic cables, particularly in large-load applications. Synthetic cables are ideal for large and critical applications where the potential weight saving offsets the additional cost. Examples include: vessel and offshore mooring lines, industrial lift slings, boom supports, civil engineering structural pendants, and large equipment working hoist and winch lines.

When a termination is applied to a cable, the integrity of the strands within the termination and just outside the termination are both critical. Most terminations are designed to be closed structures (useful for protecting the filaments within and excluding rocks and other contaminants). The closed nature prevents visual inspection of the component strands. There has traditionally been no good way to assess the health of the cable in these critical areas.

In the case of a large synthetic filament cable, an inspector's visual inspection of thousands to millions of hair-like filaments within or around the termination is highly subjective. The lack of reliable and practical inspection methods remains an issue for synthetic cables.

The present invention provides a termination system for a cable made of advanced synthetic strands. The inventive system creates a meaningful and practical inspection method for such cables.

BRIEF SUMMARY OF THE PRESENT INVENTION

The present invention comprises a system for monitoring the performance of a multi-stranded tensile member where a portion of the strands are concealed within a termination. The invention provides a monitoring system that allows the user to determine when one or more of the strands has degraded to a point of concern. In some embodiments the monitoring system depends on visual inspection and in other embodiments the monitoring system is automated.

Figure 1:
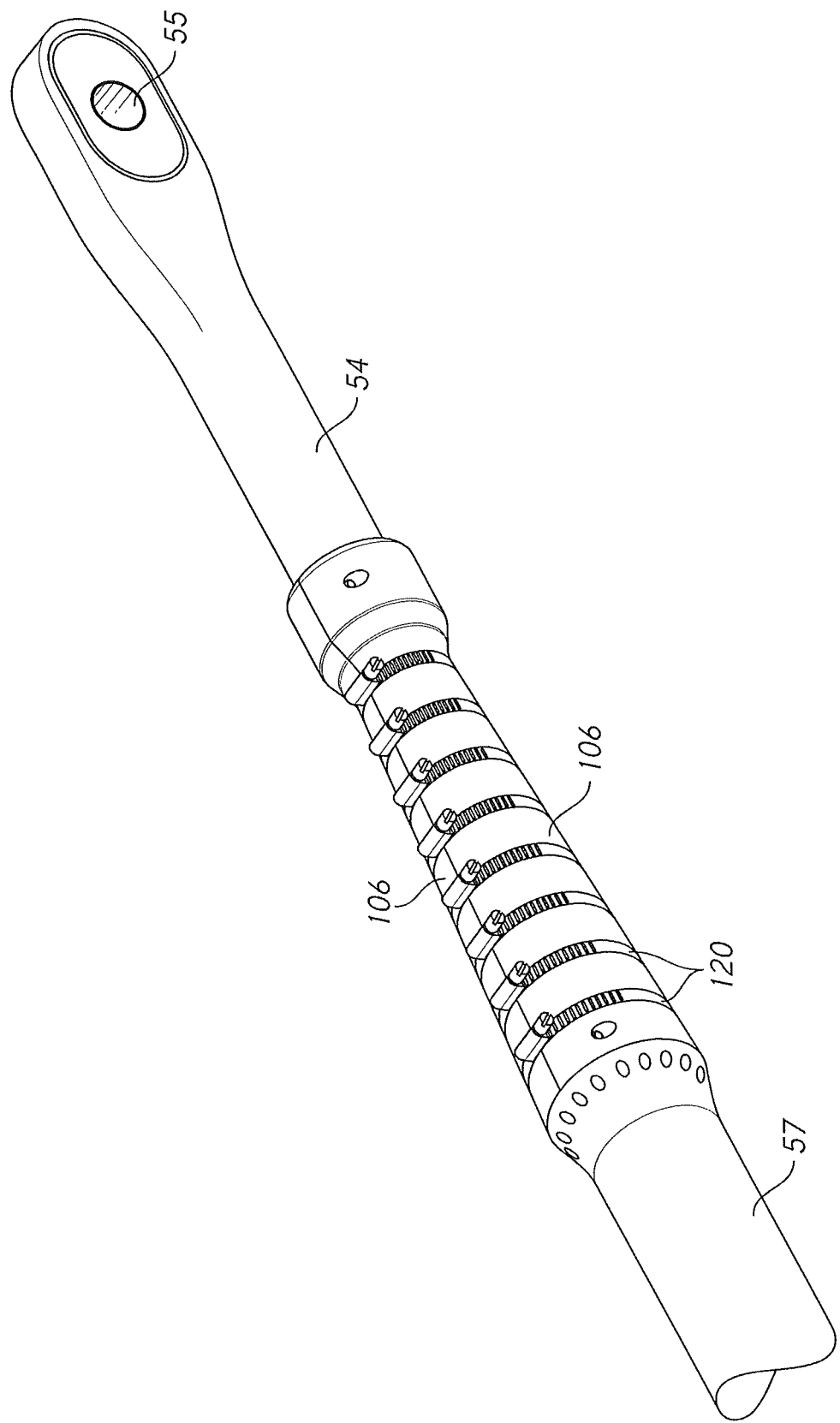
FIG. 1 is a perspective view, showing a termination made according to the present invention.

REFERENCE NUMERALS IN THE DRAWINGS 12 strand
18 anchor
54 termination
55 eye
57 shroud
60 strand
62 collector
64 nut
106 bend restrictor half
108 mounting hole
110 receiver
112 clamp receiver
114 bolt
116 inspection region
118 bolt flange
120 band clip
122 band
124 marking band
126 bolt boss
128 marking band segment
130 molded frangible collar
132 electronics housing
134 indicator
136 gap
138 circumference
140 strand engagement
142 fracture
144 conductive ring
146 processor
147 receiver
148 memory
150 R/F module 151 optical distance sensor
152 sensor module
153 reflector ring
154 strand guide/cover
155 lateral restraining feature
156 port
158 optical sensor
159 cover
160 band
161 eye
162 wiring
163 collector cover
164 data port
166 frangible conductor
168 transverse pin
170 guide tube
172 guide
174 connector
176 displacement transducer
178 sense wire
180 clamping collar
182 strand collar
184 diverging region
186 normal cable lay

DETAILED DESCRIPTION OF THE INVENTION

The inventive components and methods are applicable to many different tensile strength members and terminations. The following descriptions pertain to one specific type of termination. This type is exemplary, and should not be viewed as limiting.

FIG. 1 shows a termination assembly configured to incorporate the present invention. A multi-stranded synthetic cable runs through the interior of shroud 57 and the two joined bend restrictor halves 106. The two bend restrictor halves are clamped in placed by a series of band clamps 120. The cable strands run into the interior of termination 54. Each strand in this example has an anchor attached to its end and the anchors are all attached to a collector inside the termination. The particular termination shown includes a transverse eye 55. A pin is passed through this eye in order to attach the termination to a clevis or other structure.

In this example the reader will appreciate how the structure shown protects the synthetic strands of the cable. This protection is important—as such a cable is often installed in a hostile environment. As one example, such a cable may be a boom pendant supporting the load of a large boom on a drag-line crane. However, the shielding of the cable also inhibits the ready inspection of the cable. Individual cable strands can slip or even break without the condition being visible in the view of FIG. 1. Thus, the assembly is designed to be opened to permit inspection.

Figure 2:
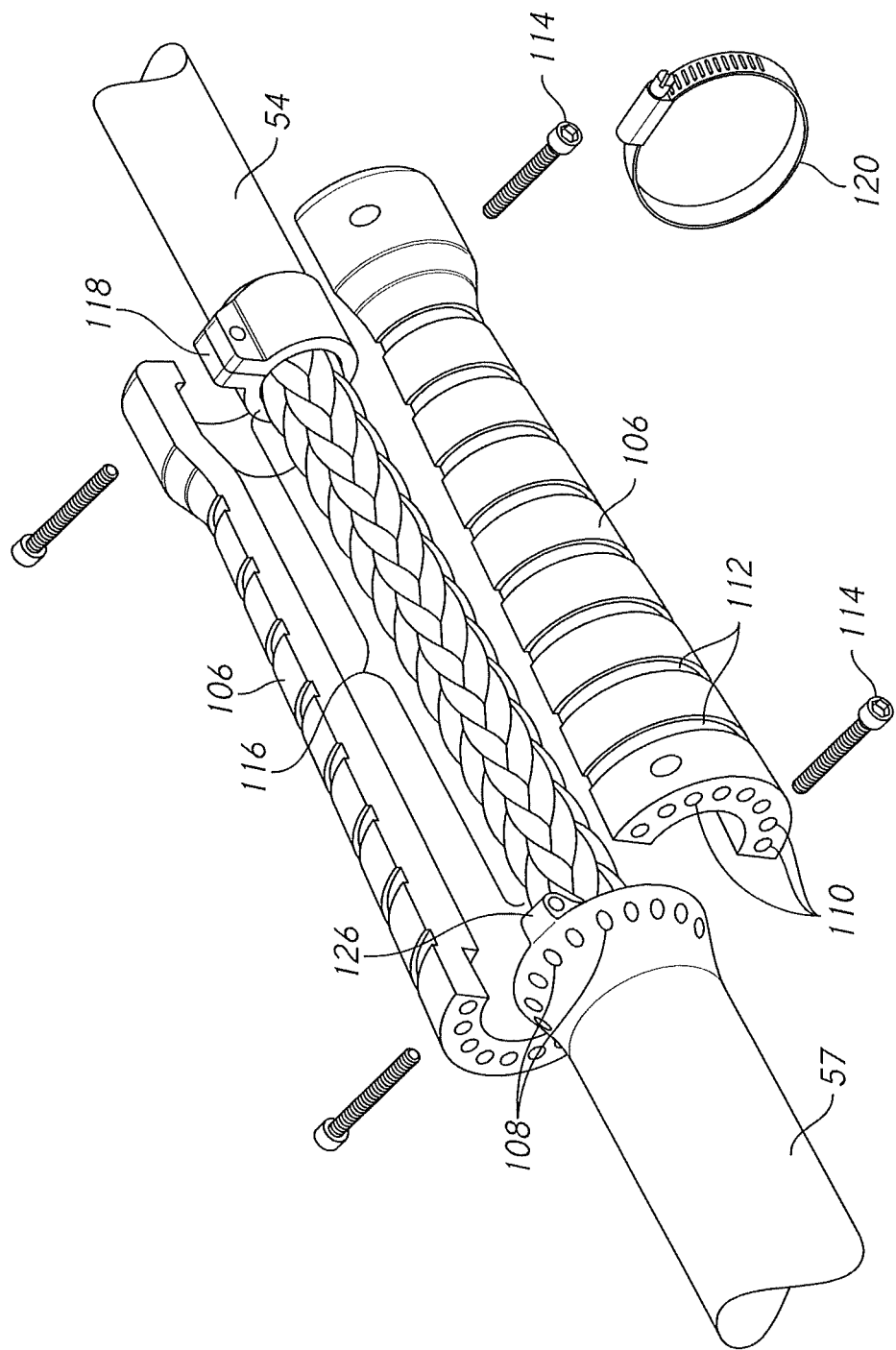
FIG. 2 is an exploded perspective view, showing the configuration of FIG. 1 with the bend restrictors removed.

FIG. 2 shows the same assembly with the two bend restrictor halves 106 removed to reveal inspection region 116. The bend restrictor halves are removed by removing all the band clamps 120. A group of additional bolts 114 are removed from bolt flanges 118 and bolt bosses 126. Additional bolts (not shown) linking shroud 57 to bolt receivers 110 on bend restrictor halves 106 are also removed. With these attachment features removed, the braided strands of the cable itself can be inspected.

Figure 3:
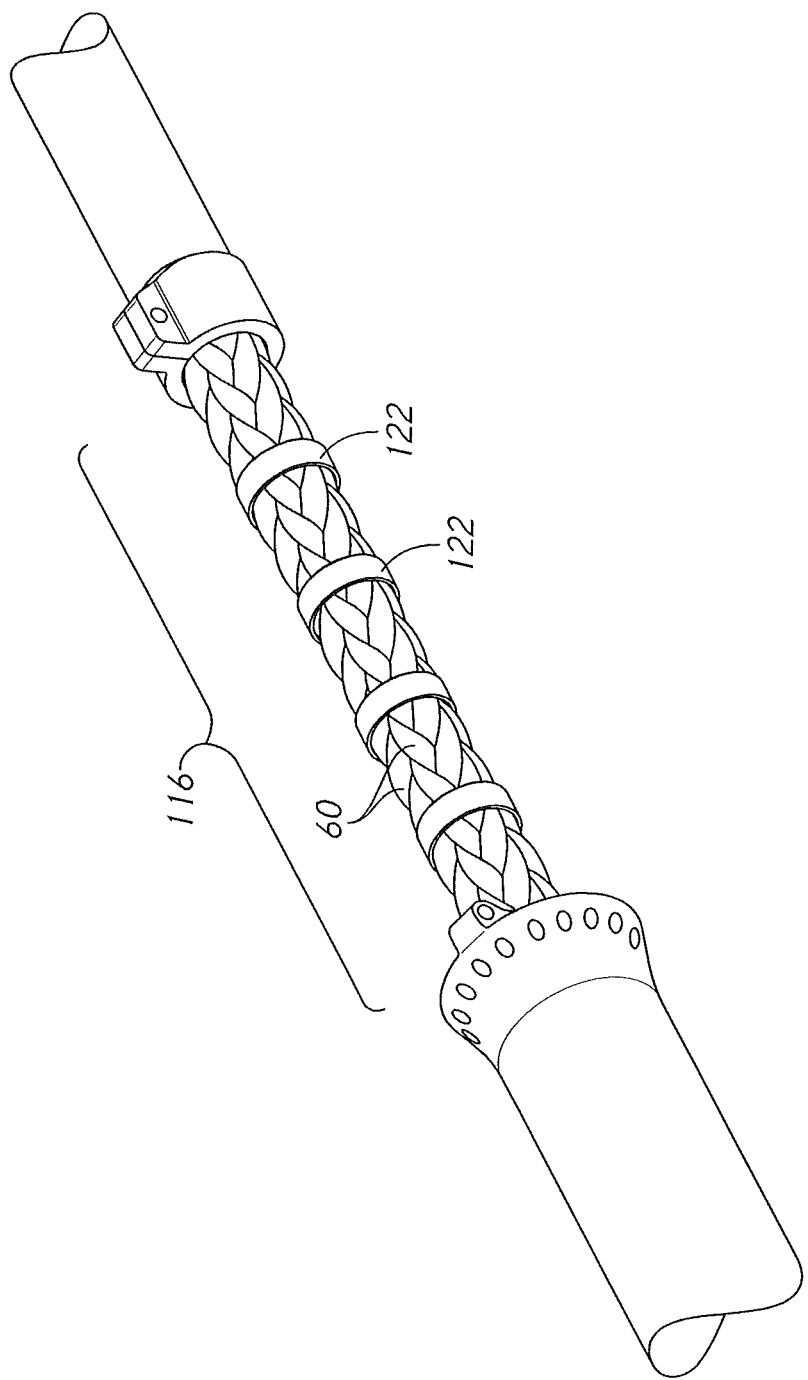
FIG. 3 is a perspective view, showing the addition of bands.
Figure 4:
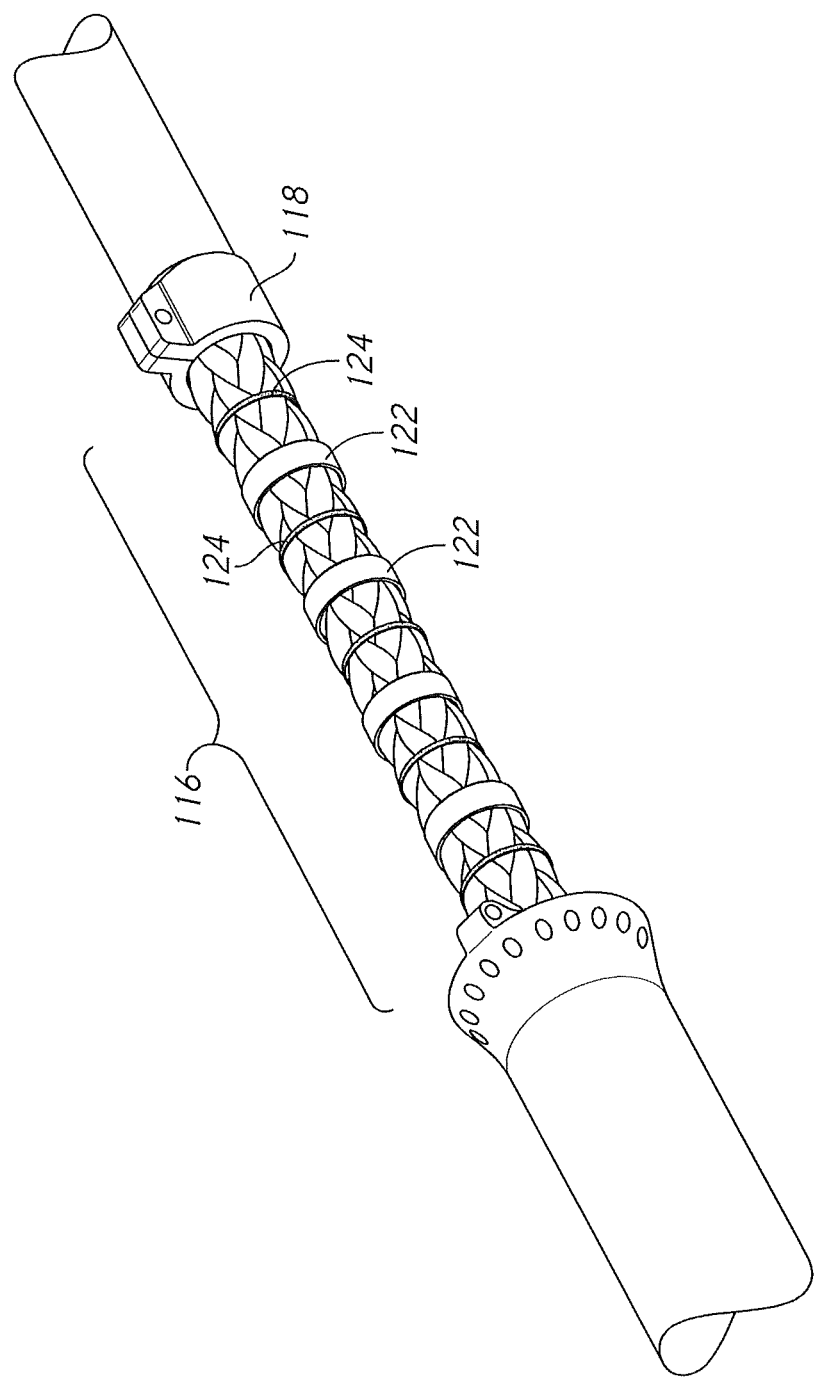
FIG. 4 is a perspective view, showing the addition of reference markings.

In FIG. 3, circumferential bands 122 have been added to the cable in inspection region 116. FIG. 4 shows the same assembly with the addition of marking bands 124 at periodic intervals. The marking bands are applied to the exterior of the cable strands in a way that preferably creates a sharp edge to the marked region. The exterior surface of the cable is complex, owing to the nature of the braided construction. The marking bands can be added by spraying, printing, painting, or any other suitable method. The presence of the marking bands allows the inspector to more easily detect any shift in the cable's construction. Such a shift is most often the result of (1) longitudinal creep, or (2) wear and tear in the overall system. The ability to accurately measure displacement from a fixed reference is very helpful in carrying out the inspection of a cable.

The marking band is preferably added after the cable has been "seated" by initial loading and preferably while the cable is under a load roughly comparable to the load it will experience in the field. This approach eliminates displacement phenomena that occur when the cable goes slack.

Figure 5:
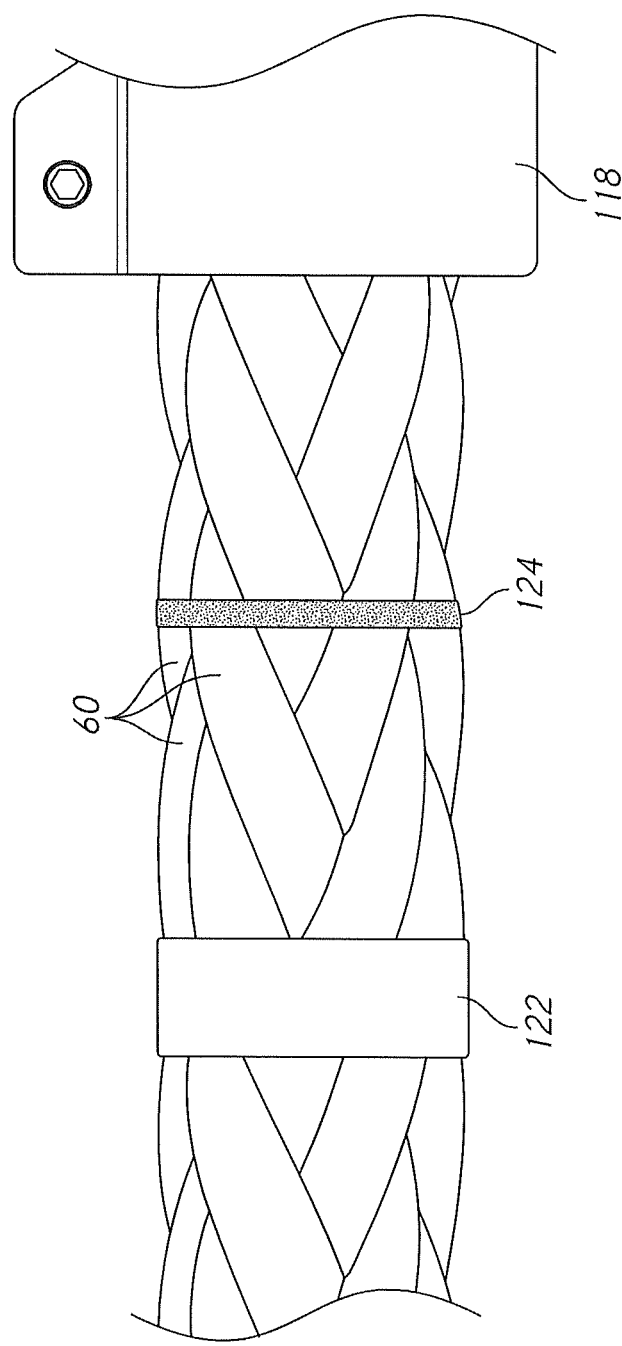
FIG. 5 is a detailed elevation view, showing the configuration of FIG. 4.

FIG. 5 depicts a detailed elevation view of one of the marking bands 124. The band in this example is a ring oriented perpendicularly to the central axis of the cable. Those skilled in the art will know that the outer surface of the cable is quite complex. Strands 60 are braided so that they "dive" into the interior of the construction—where they are not visible—and reemerge at a later point. This creates a complex surface that varies somewhat over the length of the cable. Thus, marking band 124 only appears to be straight and uniform when viewed from the vantage point shown in FIG. 5. However, this vantage point is very useful for inspection. It is possible to measure the linear displacement from a fixed reference (such as bolt flange 118) to a particular portion of marking band 124. If one of the strands slips relative to its neighbors, the displacement of a portion of marking band 124 will stand out.

Figure 6:
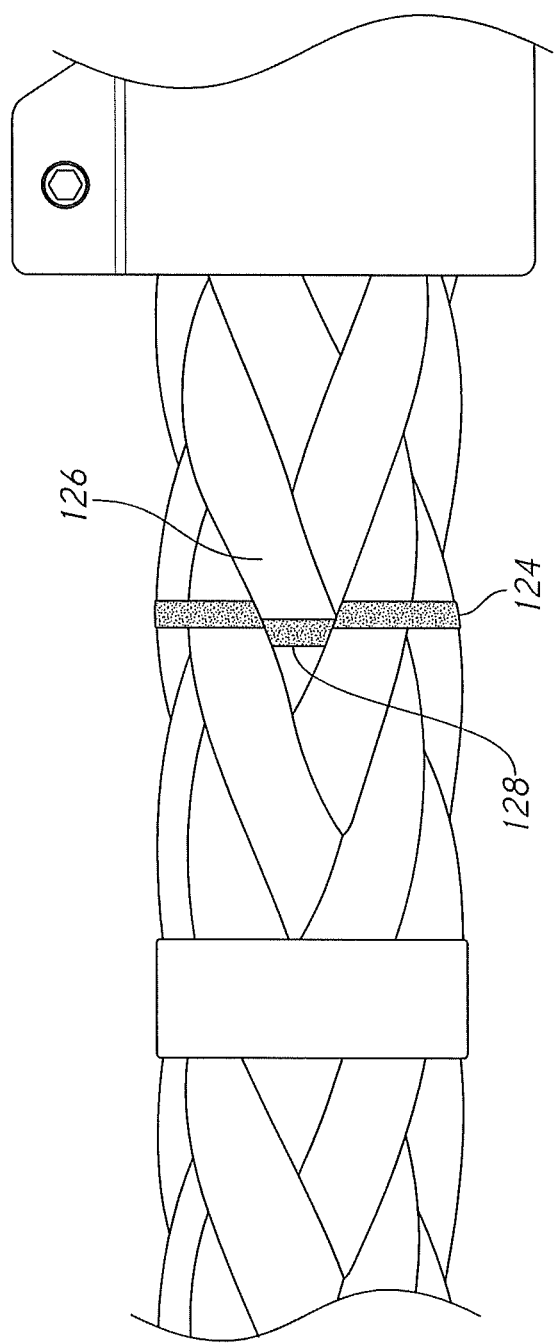
FIG. 6 is a detailed elevation view, showing the configuration of FIG. 4 after a single strand has slipped relative to the other strands.

FIG. 6 shows this condition. In FIG. 6, slipped strand 126 has become longitudinally displaced from its neighbors. Marking band segment 128 stands out—as it is now no longer aligned with the balance of marking band 124. The inclusion of the marking band allows a quick visual inspection to detect a problem that would not be apparent without the marking. An inspector can also measure the amount of slip compared to a fixed reference such as bolt flange 118.

It is possible to provide more complex markings than the simple band shown. Curved or wavy lines can be added rather than a simple perpendicular ring. In addition, it is possible to mark the individual strands so that a position of a particular strand can be inspected over the length of inspection region 116.

Figure 7:
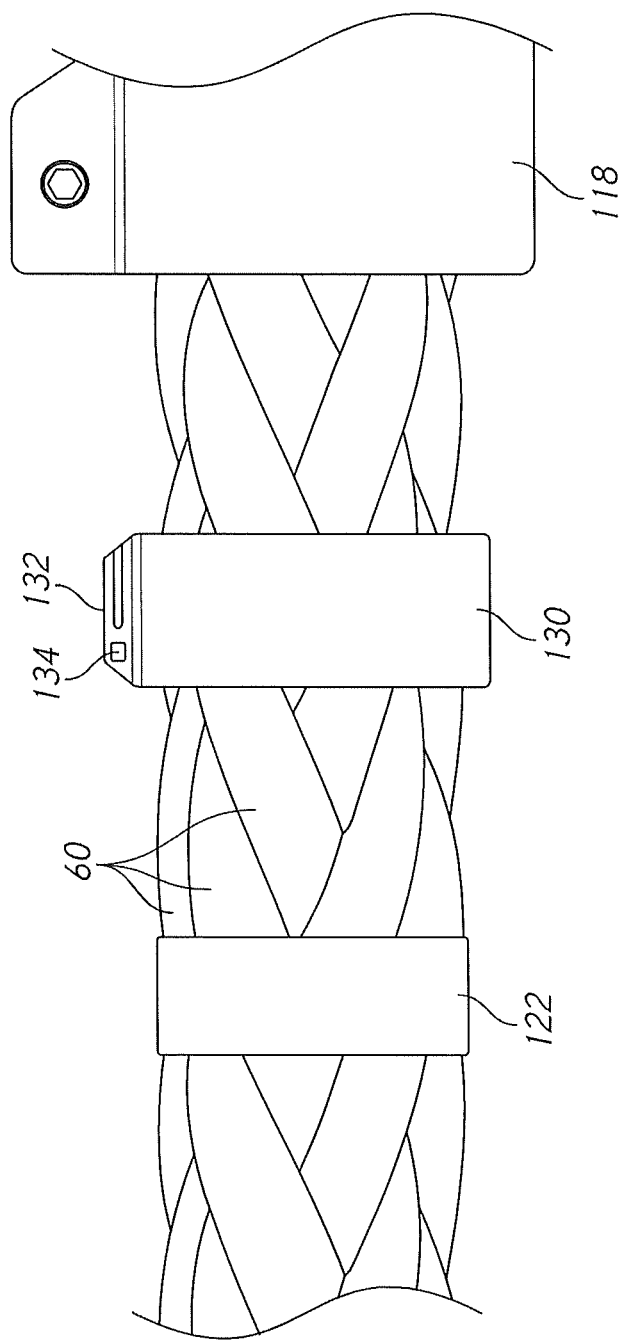
FIG. 7 is an elevation view, showing the addition of a molded frangible collar.

FIGS. 7-10 depict a second embodiment of the marking system that takes a different approach. FIG. 7 shows the addition of molded frangible collar 130 to the cable. Electronics housing 132 is provided as part of the molded frangible collar. It contains an instrumentation package. Indicator 134 is placed in an appropriate position. The indicator can assume a variety of forms. As one example, the indicator can be a light that illuminates in different colors—green indicating a satisfactory status and blinking red indicating a problem.

Figure 8:
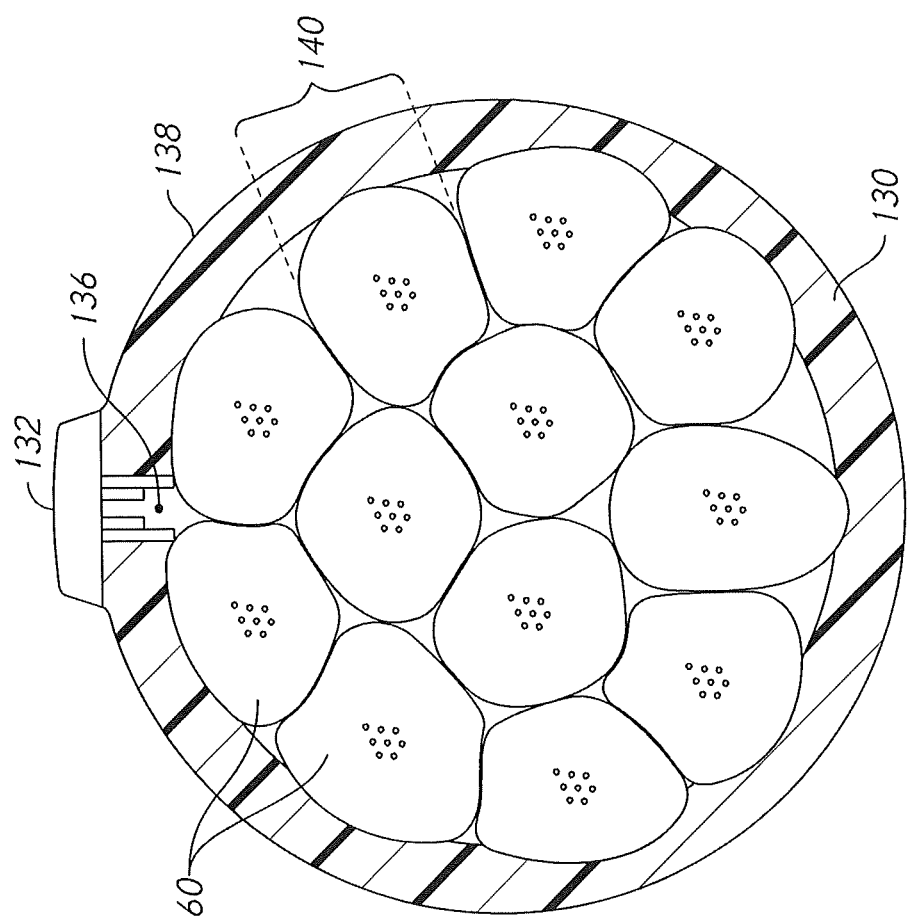
FIG. 8 is a sectional elevation view, showing the addition of a molded frangible collar.

FIG. 8 provides a sectional elevation view through the molded frangible collar. One approach is to actually mold the frangible collar in place. The mold produces a smooth outer circumference 138. The inner portion flows over the various strands. In certain areas the molding material bonds to the strands. These areas are designated strand engagements 140.

Gap 136 is provided. In this example electronics housing 132 is located proximate gap 136. The electronics housing may be attached as part of the molding process or it may be added later. The material choses for the molded frangible collar is significant. The material selected preferably has the following characteristics: (1) It is electrically conductive—at least to some extent; (2) It creates a suitably strong surface bond in strand engagements 140; and (3) It is sufficiently brittle to fracture when a strand slips.

Figure 9:
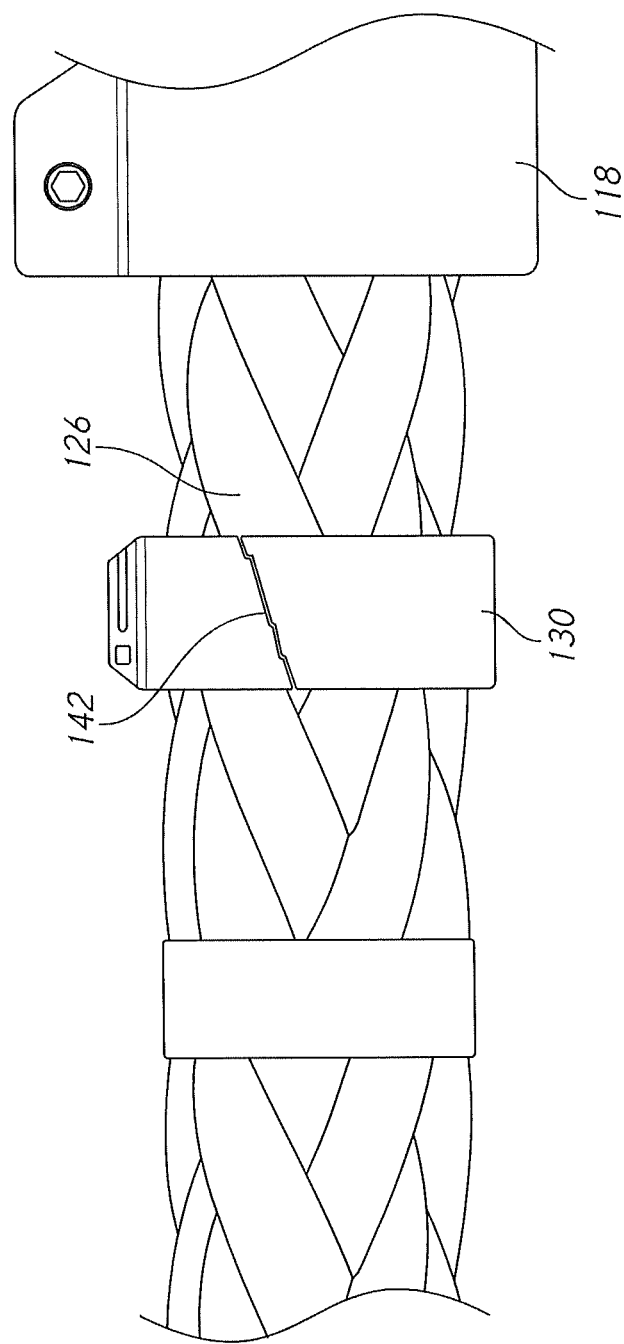
FIG. 9 is an elevation view, showing the operation of the frangible collar.

Many materials can be used for this. One example is a brittle urethane with conductive filaments added. Monitoring electronics can pass a small current around the ring of brittle urethane and monitor the resulting voltage drop. FIG. 9 shows the molded frangible collar 130 after slipped strand 126 has been longitudinally displaced from its neighbors. Fracture 142 has occurred in the frangible collar. This fracture will be read by the monitoring electronics as either a substantial increase in the voltage drop or an outright open circuit.

Figure 10:
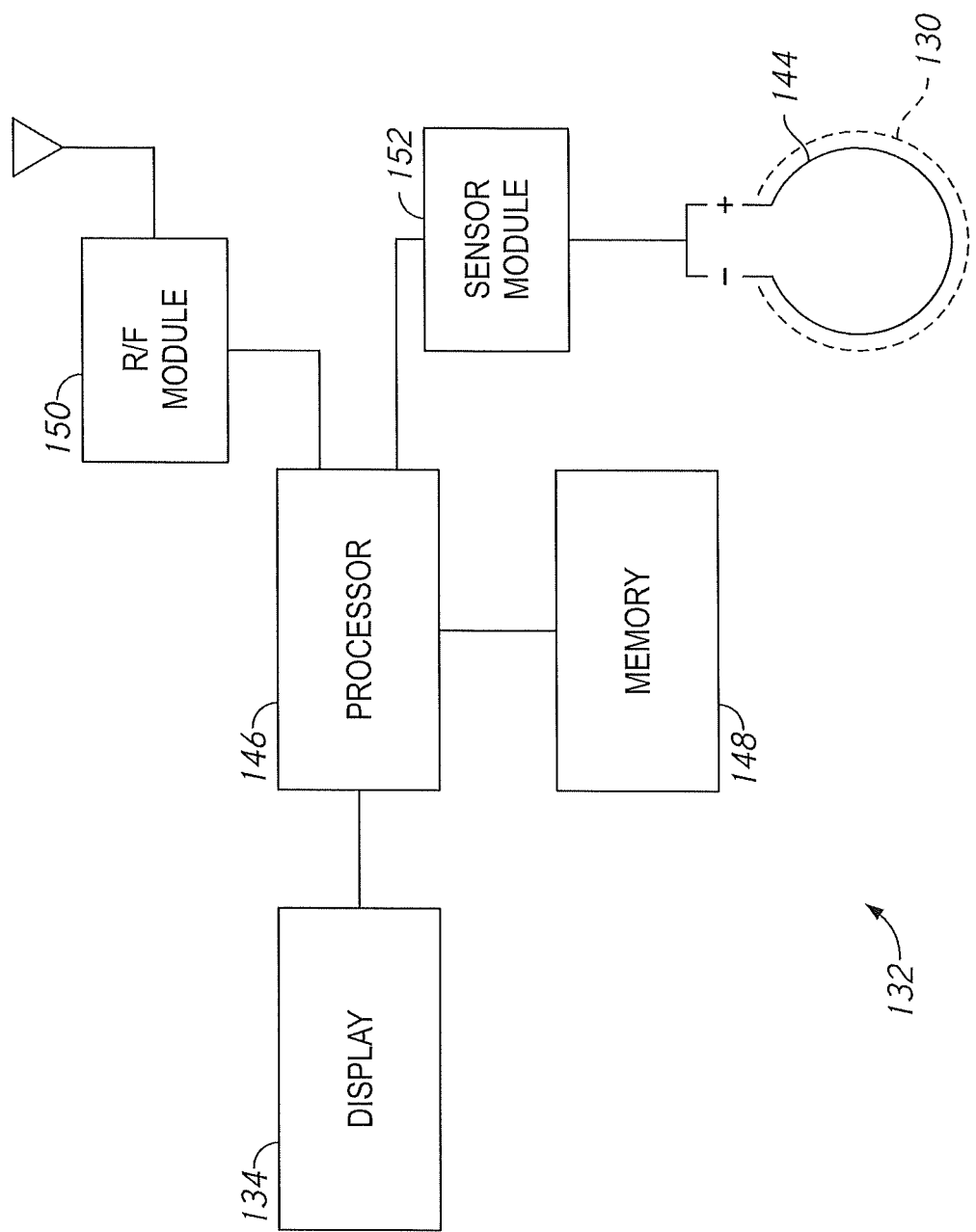
FIG. 10 is a block diagram showing the monitoring and communication components used with the frangible collar.

The monitoring electronics can assume many forms. FIG. 10 depicts one embodiment of this equipment. Sensor module 152 monitors the electrical resistance around conductive ring 144 formed by molded frangible collar 130. The output of the sensor module is fed to processor 146. Associated memory 148 stores the software and data used by the processor. Indicator 134 is also driven by the processor. In this example, a radio frequency module 150 is provided. This RIF module is configured to communicate the status of the frangible ring to an outside monitoring device. Many such systems can be placed on a monitoring network.

A large drag-line crane might have a dozen or more molded frangible collars located around the rigging. A central processor can be used to monitor the state of all these collars and alert a supervisor if a problem is detected. An obvious advantage of this approach is that the monitoring functions can be carried out without the need for any disassembly.

Figure 11:
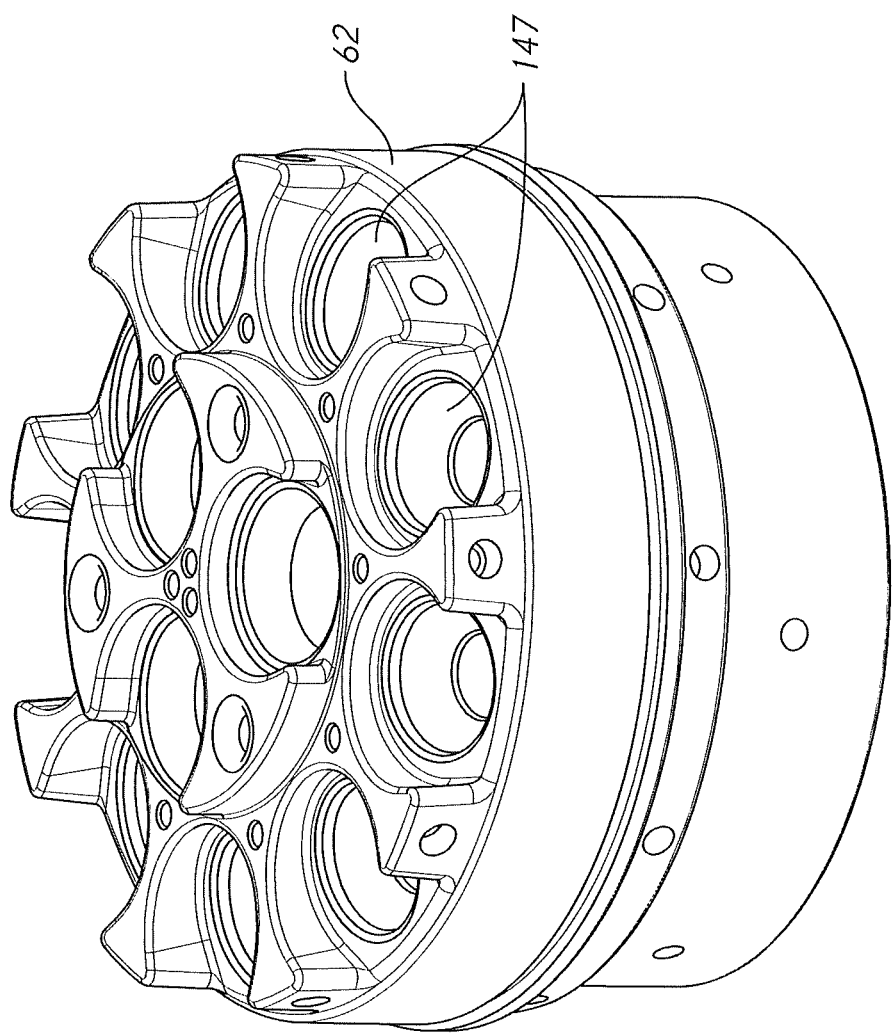
FIG. 11 is a perspective view, showing a collector used to terminate a multi-stranded cable.
Figure 12:
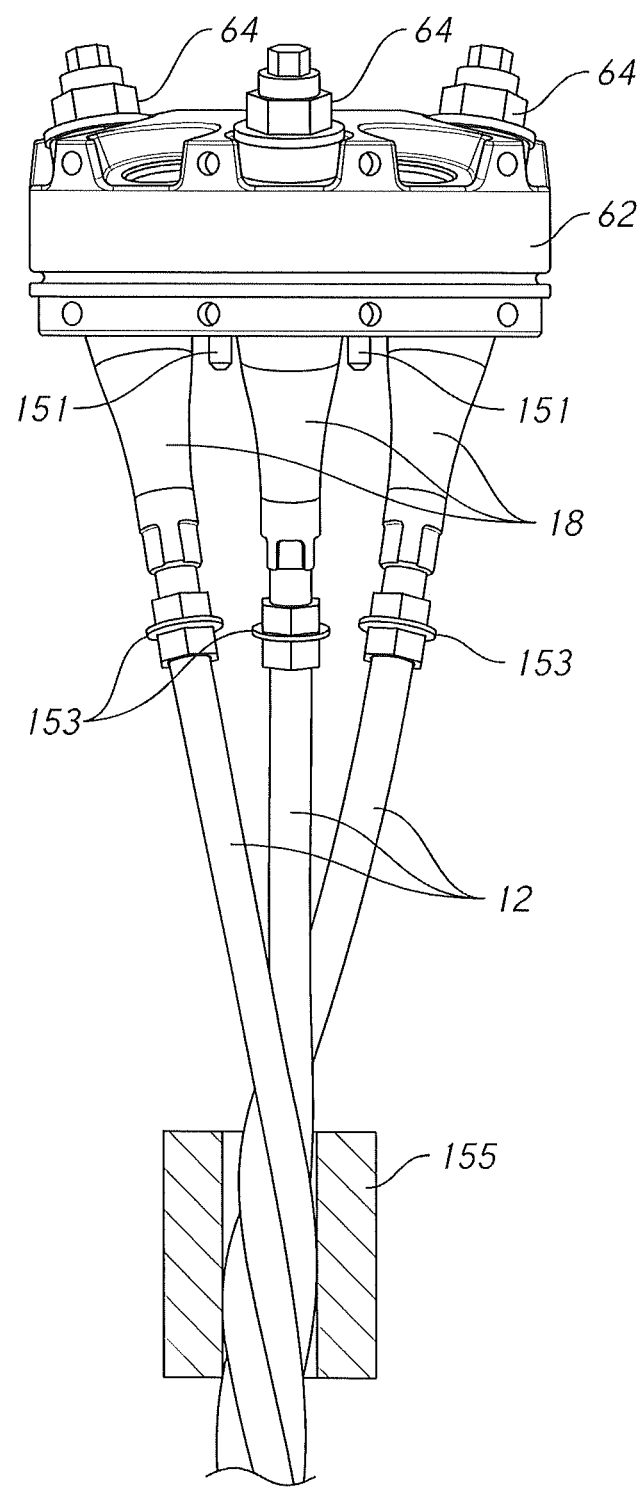
FIG. 12 is an elevation view, showing an embodiment in which optical distance measuring equipment is used to monitor the strands.

FIGS. 11-12 show another embodiment. FIG. 11 provides a perspective view of a collector 62 that is used to aggregate the individual anchors on the end of each strand of a cable. The collector includes multiple receivers 147—each of which is configured to receive an anchor (often using some piece of interconnecting hardware).

The collector of FIG. 11 includes twelve separate receivers—making it suitable for a 12-strand cable. FIG. 12 shows a cable having only three strands attached to this collector 62. The depiction of only three strands provides visual simplicity, though the components depicted can be used equally with a cable having all 12 strands. An anchor 18 is attached to the end of each individual strand 12. Each anchor includes an attachment feature for connecting it to collector 62. In the example shown the attachment feature is a threaded stud extending from the anchor. A nut 64 is threaded onto the end of this stud and used to secure the anchor to collector 62.

A reflector ring 153 is mounted on a strand collar that is attached to each strand 12—preferably near the point where the strand emerges from the anchor. Optical distance sensors 151 are mounted to the collector. Each optical distance sensor is positioned and oriented to direct a beam to a particular reflector ring 153. The sensor is configured to precisely measure the distance to the reflector ring. If a strand is displaced, the sensor will detect the displacement.

The optical distance sensors feed information to an instrumentation package within collector 62. The information collected by the instrumentation package may be stored locally or transmitted to an external monitoring device.

It is preferable for the measuring instruments 151,153 to be positioned in a stable and straight portion of the cable. A lateral restraining feature 155 is provided to inhibit unwanted lateral motion of the cable and thereby ensure the stability of the strands in the region of measurement. Lateral restraining feature 155 will often be part of a larger cover configured to protect the strands and anchors proximate the collector, though this need not always be the case.

Figure 13:
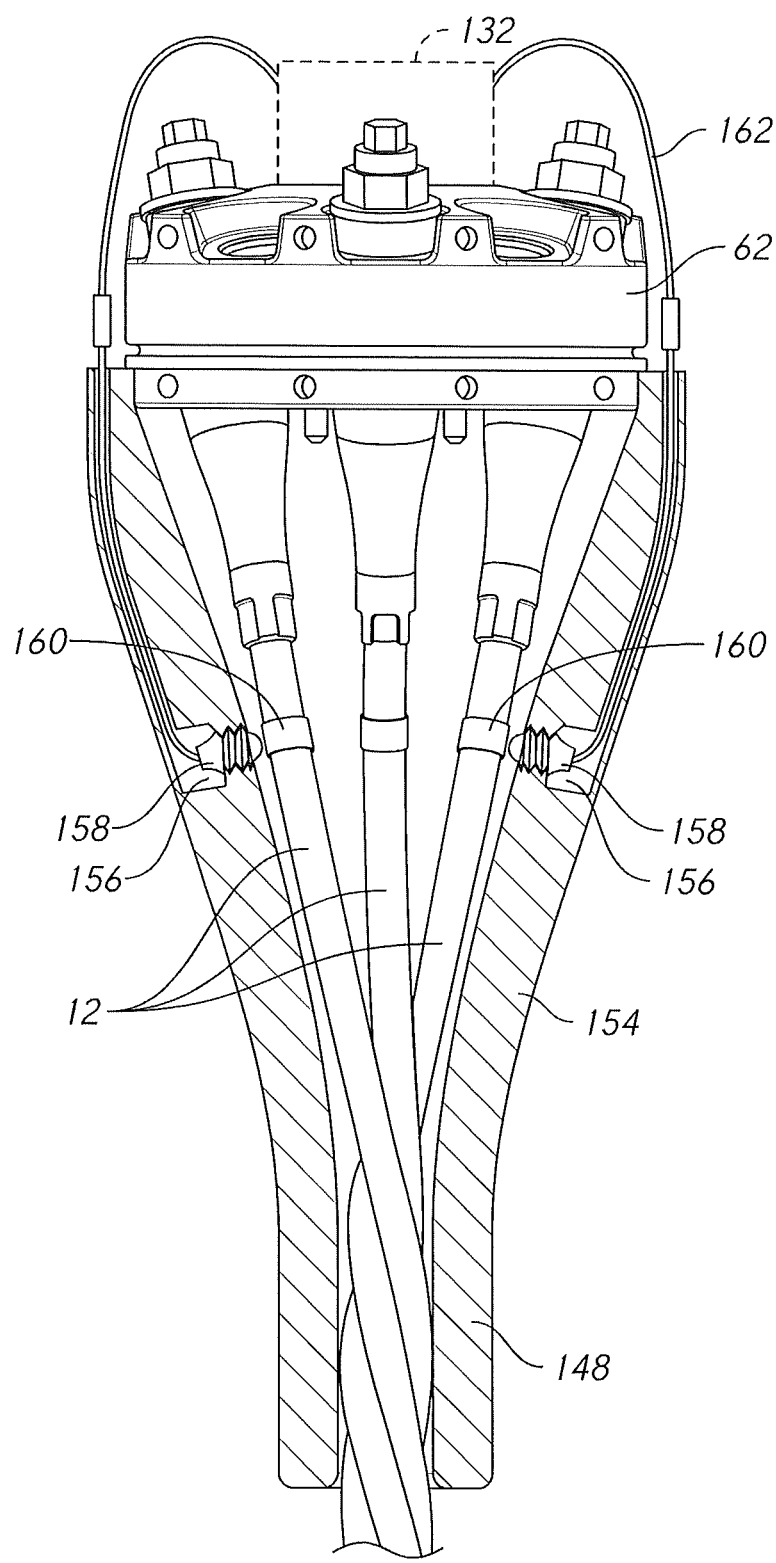
FIG. 13 is an elevation view, showing an embodiment in which optical reflectance measuring equipment is used to monitor the strands.
Figure 14:
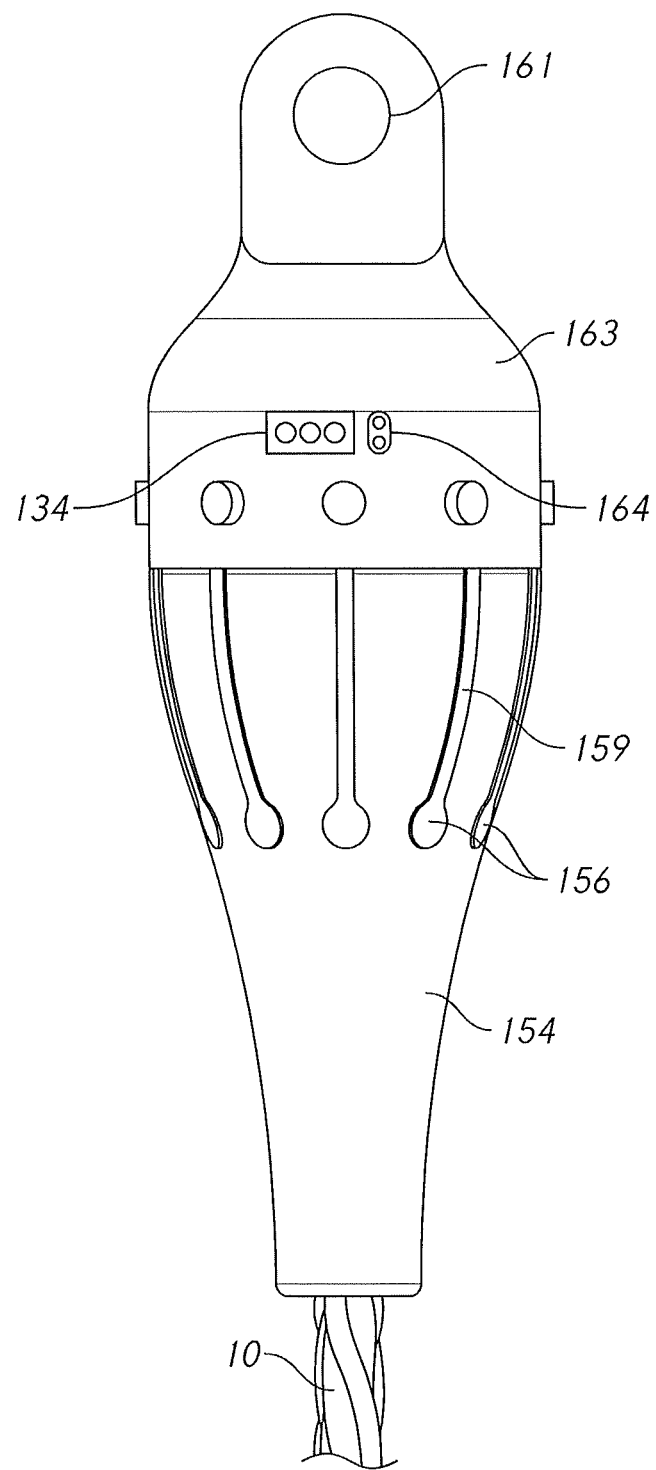
FIG. 14 is an elevation view, showing the configuration of FIG. 13 with the addition of a collector cover.

FIGS. 13 and 14 show still another embodiment. In the version of FIG. 13, lateral restraining feature 148 is incorporated as part of strand guide/cover 154. This cover in this example is a rigid piece that connects to collector 62. Strand guide/cover 154 incorporates a number of radial ports 156—each of which is configured to mount an optical sensor 158. The ports are positioned so that each optical sensor points to a particular strand 12.

In this example, a band 160 is printed on each strand. The optical sensor in this example has an emitter and a detector. The detector measures reflectance from a particular strand. If a strand is longitudinally displaced, then its band 160 will move relative to the optical sensor positioned to measure it. The result will be a change in measured reflectance.

All the optical sensors 158 in this example are hard wired to an instrumentation package contained within electronics housing 132. Information collected form the optical sensors can be stored locally or transmitted to an external monitoring device.

FIG. 14 provides an exterior view of the example of FIG. 13. Ports 156 and the channels of the wiring are covered by a durable cover 159 (possibly simply potting compound). This protects the integrity of the devices contained. Collector cover 163 attaches to the collector. This structural cover includes a loading eye 161 configured to transmit an external load.

Data port 164 is provided so that a monitoring system can be plugged into the device. This data port can also provide charging to renewable energy sources contained within electronics housing 132. Indicator 134 provides an external visual indication as to the condition of the strands within the termination. As a simple example, it can include green, yellow, and red LED's. In this example, a green LED indicates a normal condition. A yellow LED indicates that some strand slippage has been detected. A red LED indicates that one or more strands has slipped beyond a predetermined maximum.

Figure 15:
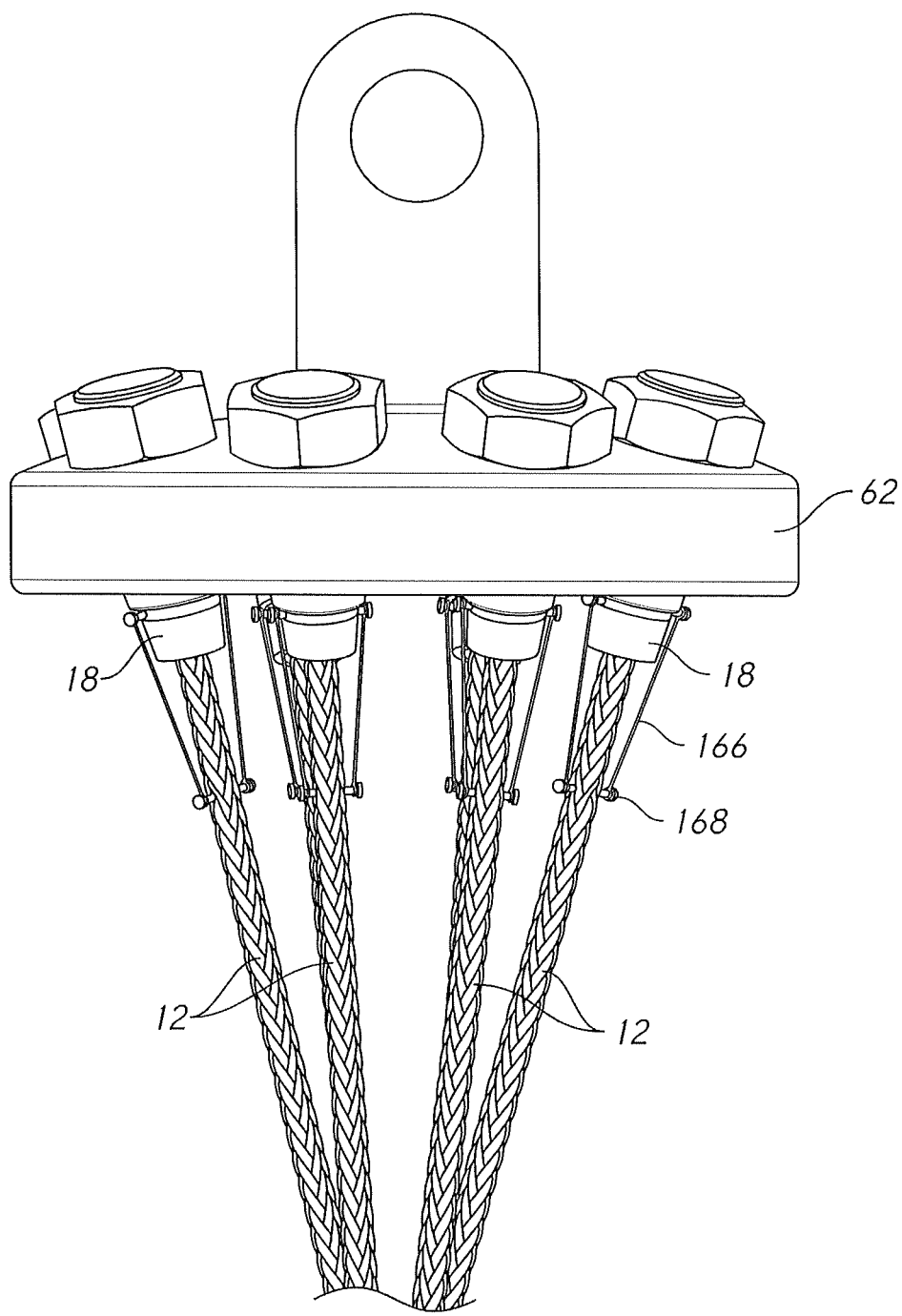
FIG. 15 is an elevation view, showing the use of a frangible conductor to monitor the strands.
Figure 16:
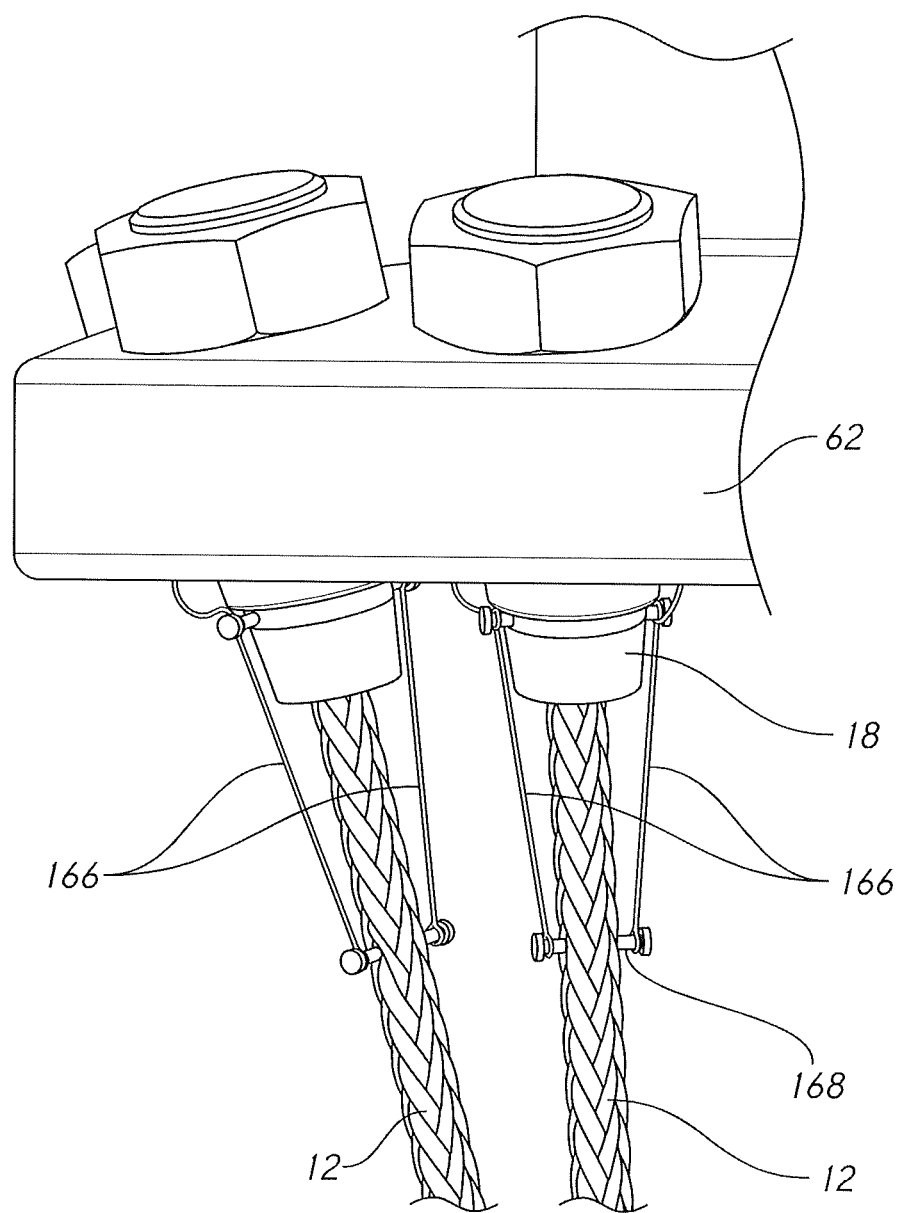
FIG. 16 is an elevation view, showing the use of a frangible conductor to monitor the strands.

FIGS. 15 and 16 show yet another embodiment. In this example, anchors 18 are again attached to strands 12. These anchors are then attached to collector 62. In this example a transverse pin 168 is passed through each strand proximate the anchor 18. A frangible conductor 166 connects the exposed end of each pin to a fixed point on the anchor or collector. The pin itself is conductive. A small current is passed through each assembly of two frangible conductors and the linking transverse pin.

The frangible conductor is configured to break when the strand to which it is attached experiences a set level of displacement. In this example, when a strand is displaced longitudinally it urges its transverse pin 168 away from its accompanying anchor and breaks one of the two frangible conductors attached to the transverse pin. A monitoring electrical circuit detects the break as an open circuit and uses this fact to detect a failure.

Figure 17:
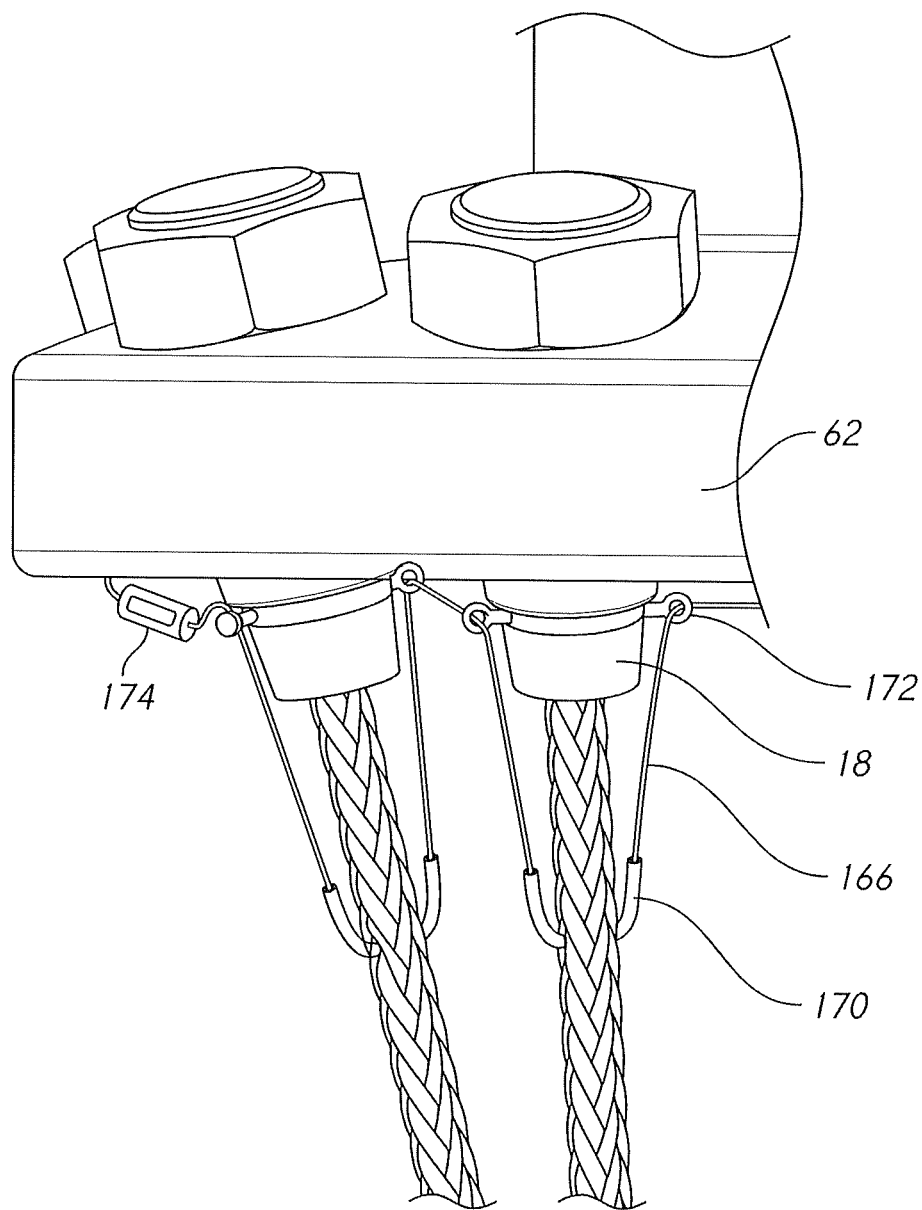
FIG. 17 is an elevation view, showing the use of a frangible conductor to monitor the strands.

FIG. 17 shows a variation on the embodiment of FIGS. 15-16. In this late example a guide tube 170 is passed transversely through each strand. A single frangible conductor 166 is passed from a first fixed point through all the guide tubes and then to a second fixed point. A connector 174 connects each end of the single frangible conductor 166 to a monitoring circuit. Various guides 172 are provided to route the frangible conductor. The longitudinal displacement of any single strand will break the frangible conductor and the monitoring electrical circuit will detect the breakage.

Figure 18:
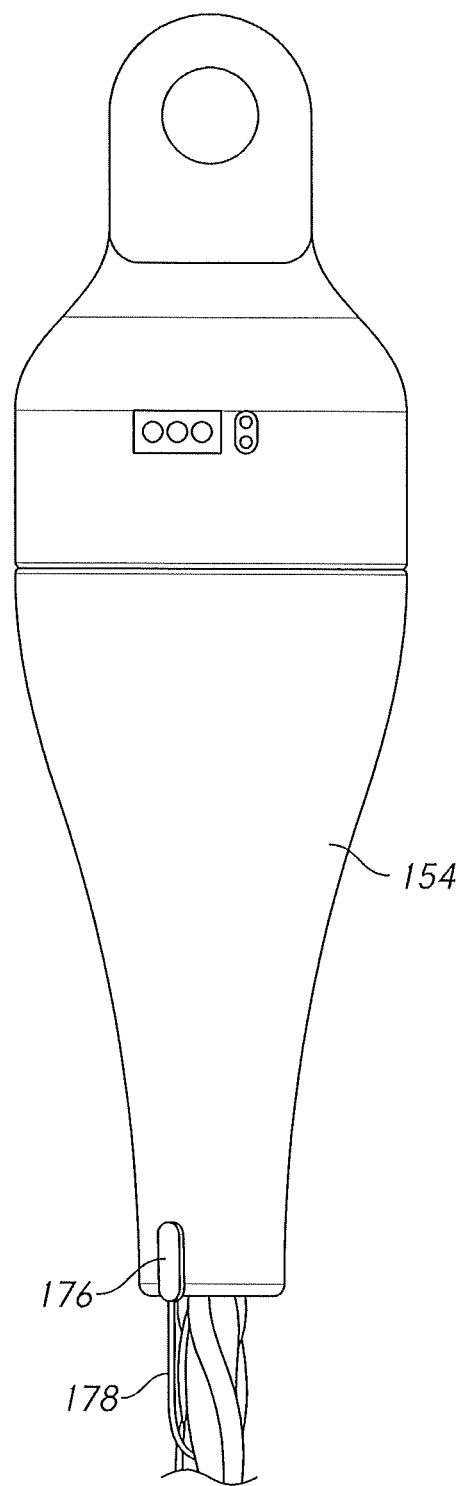
FIG. 18 is an elevation view, showing a displacement detection system configured to monitor the cable as a whole.
Figure 19:
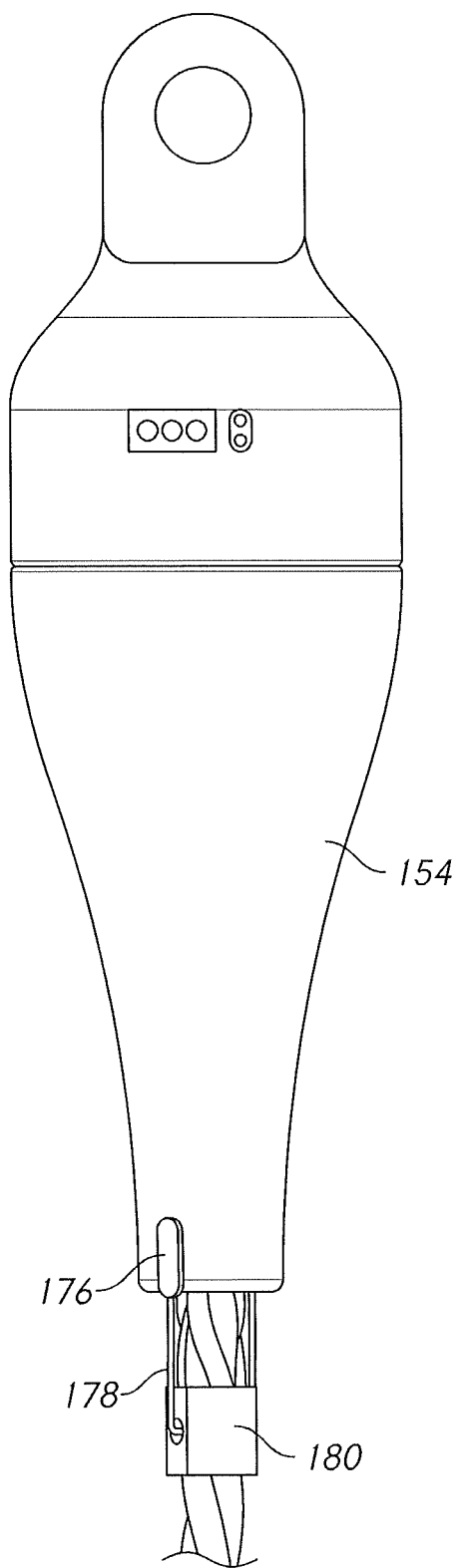
FIG. 19 is an elevation view, showing a displacement detection system configured to monitor the cable as a whole.

FIGS. 18 and 19 depict embodiments configured to monitor for the slippage of the cable as a whole, rather than the slippage of an individual strand. In the example of FIG. 18, a single sense wire 178 is passed transversely through the weave of the cable as a whole. The two free ends of the sense wire are anchored in a displacement transducer 176. As the cable elongates, the displacement is sensed and reported. The amount of displacement is preferably "zeroed" when the cable is loaded initially, so that cable setting and slack is taken out of the distance measurements.

FIG. 19 shows a different approach. Clamping collar 180 is securely affixed to the cable just outside of strand guide/cover 154. A sense wire 178 is passed from the clamping collar to displacement transducer 176. Multiple sense wires may be used, around the perimeter of the clamping collar. The clamping collar moves with the cable. Any longitudinal displacement of the cable as a whole is detected via the motion of the clamping collar.

The clamping collar in this example may be a split collar that is mechanically clamped to the cable. It may also be potted to the cable to form a secure bond. In addition, transverse pins or spikes can be passed from the clamping collar through the cable to better lock it to the cable.

Figure 20:
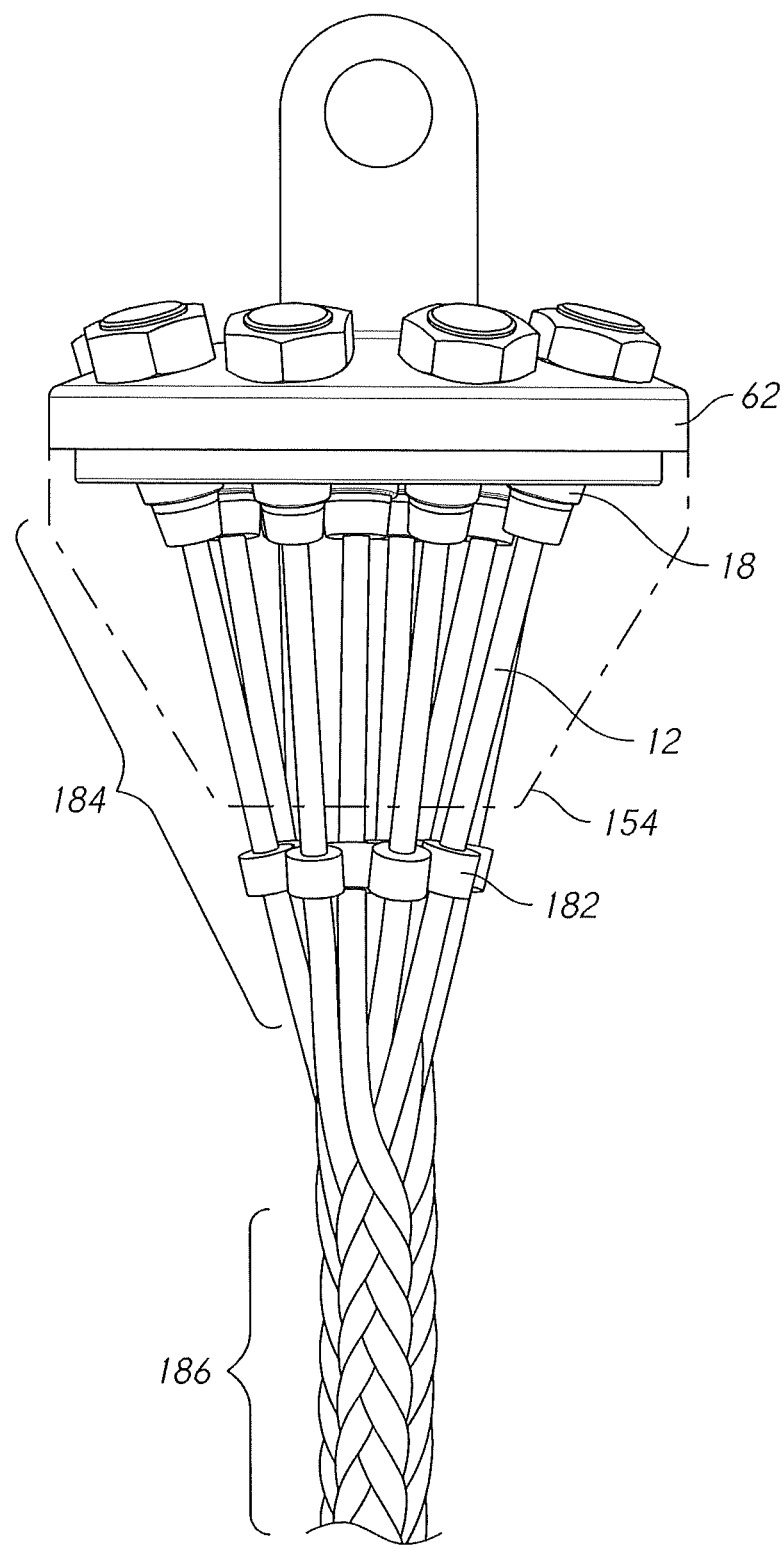
FIG. 20 is an elevation view, showing the use of strand collars located outside the strand guide/cover.
Figure 21:
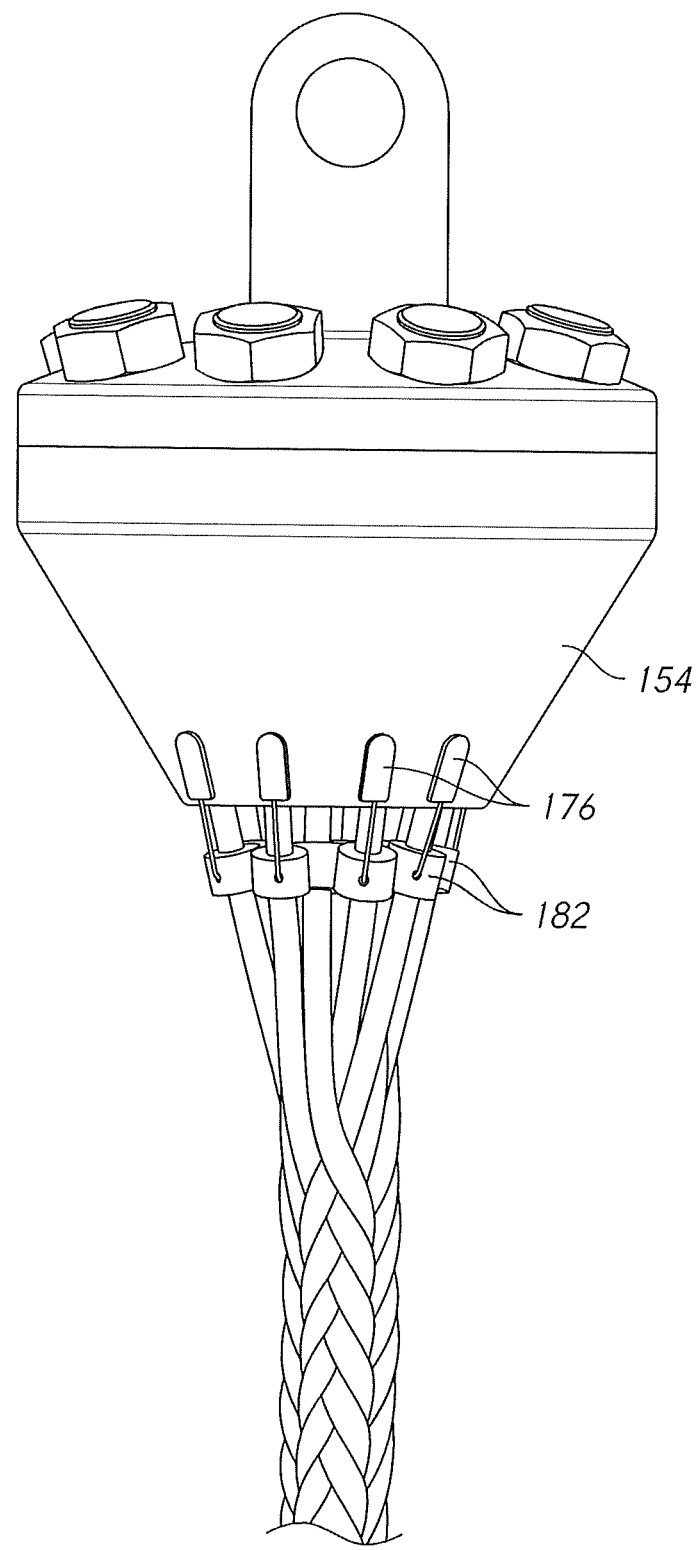
FIG. 21 is an elevation view, showing the use of strand collars located outside the strand guide/cover.

FIGS. 20 and 21 show still another embodiment—this one configured to monitor individual strand displacement at a point outside of the strand guide/cover. FIG. 20 shows the assembly with strand guide/cover 154 shown as a dashed line. A strand collar 182 is affixed to each individual strand—outside of strand guide/cover 154. The strand collars can be split collars that are secured by fasteners. They may also be potted in position. The invention is not dependent upon any particular method of attachment.

FIG. 21 shows the same assembly with strand guide/cover 154 shown in solid lines. A displacement transducer 176 is provided for each strand collar 182. In this example the displacement transducers are attached to strand guide/cover 154. Each displacement transducer is linked to the strand collar by a sense wire. In a modified embodiment, each strand collar includes a pair of sense wires leadings to a pair of displacement transducers.

Using this approach, the linear displacement of each individual strand can be monitored. Initial "zeroing" readings are preferably made when the cable is initially loaded so that "cable set" and slack removal phenomenon can be accurately accounted for.

In the context of this disclosure the term "displacement sensor" is intended to include any device or assembly of devices that can detect the motion of a strand relative to some other point. Examples include:

1. An optical sensor that senses a displacement via a change in reflectance—such as depicted in FIG. 13;
2. An optical sensor that uses coherent light to measure a distance to a reflector on a strand collar;
3. An ultrasonic sensor;
4. A mechanical sensor such as an LVDT; and
5. A mechanical sensor that uses a spring-loaded reel and a connecting line that is paid out and reeled in.

Each individual strand has a strand axis—meaning a centerline of the strand that runs parallel to the instantaneous direction of the strand. The path of most strands varies so that the strand axis curves. The displacement measurement that is generally of greatest interest is one that is parallel to the strand axis. In some embodiments the quantitative value of the displacement is important and a displacement sensor that can accurately measure a quantitative value is preferred. In other instances it is only necessary to know that a strand has "slipped" along the strand axis beyond a defined threshold. In these cases a qualitative displacement sensor can be used.

Although the preceding description contains significant detail, it should not be construed as limiting the scope of the invention but rather as providing illustrations of the preferred embodiments of the invention. As an example, any of the embodiments described for use on a full cable can be adapted for use on a single strand of a larger cable, and vice-versa. Those skilled in the art will be able to devise many other embodiments that carry out the present invention. Thus, the language used in the claims shall define the invention rather than the specific embodiments provided.

The invention claimed is:

1. A monitoring system for a cable made of multiple synthetic strands, comprising:
   (a) said multiple synthetic strands being connected to a collector;
   (b) said multiple strands passing from a diverging region proximate said collector to a normal cable lay distal to said collector;
   (c) a plurality of strand collars, wherein each of said strand collars is attached to one of said strands within said diverging region;
   (d) a strand guide/cover surrounding said strands in said diverging region; and
   (e) a plurality of displacement sensors, each of said displacement sensors being configured to measure a displacement of one of said strand collars with respect to said strand guide/cover.

2. The monitoring system for a cable as recited in claim 1, wherein said strand guide/cover is attached to said collector.

3. The monitoring system for a cable as recited in claim 1, further comprising:
   (a) a plurality of anchors, wherein each of said anchors is attached to an end of one of said strands; and
   (b) each of said anchors is connected to said collector.

4. The monitoring system for a cable as recited in claim 1, wherein said displacement sensor is an optical sensor.

5. The monitoring system for a cable as recited in claim 1, wherein said displacement sensor is a mechanical sensor.

6. The monitoring system for a cable as recited in claim 1, wherein:
   (a) each of said strands has a strand axis; and
   (b) said displacement measured by each of said displacement sensors is along a said strand axis of a particular one of said strands.

7. The monitoring system for a cable as recited in claim 2, wherein each of said displacement sensors is attached to said strand guide/cover.

8. A monitoring system for a cable made of multiple synthetic strands, comprising:
   (a) a strand having an end;
   (b) an anchor attached to said end of said strand;
   (c) a collector;
   (d) said anchor being connected to said collector
   (e) said strand passing from a diverging region proximate said collector to a normal cable lay distal to said collector;
   (f) a strand collar attached to said strand within said diverging region, said strand collar being separated from said anchor;
   (g) a strand-guide/cover surrounding said strand in said diverging region; and (h) a displacement sensor configured to measure a displacement of said strand collar with respect to said strand guide/cover.

9. The monitoring system for a cable as recited in claim 8, wherein said strand guide/cover is attached to said collector.

10. The monitoring system for a cable as recited in claim 8, wherein said displacement sensor is an optical sensor.

11. The monitoring system for a cable as recited in claim 8, wherein said displacement sensor is a mechanical sensor.

12. The monitoring system for a cable as recited in claim 8, wherein:
   (a) said strand has a strand axis; and
   (b) said displacement measured by said displacement sensor is along said strand axis.

13. The monitoring system for a cable as recited in claim 9, wherein each of said displacement sensors is attached to said strand guide/cover.

\* \* \* \* \*